United States Patent [19]
Qi et al.

[11] Patent Number: 5,531,926
[45] Date of Patent: Jul. 2, 1996

[54] PHOSPHOR AND METHOD OF MAKING SAME

[75] Inventors: Ru-Yi Qi; Ronald E. Karam, both of Towanda, Pa.

[73] Assignee: Osram Sylvania Inc., Danvers, Mass.

[21] Appl. No.: 425,536

[22] Filed: Apr. 20, 1995

Related U.S. Application Data

[63] Continuation-in-part of Ser. No. 189,012, Jan. 28, 1994, abandoned, which is a continuation-in-part of Ser. No. 999,637, Dec. 31, 1992, abandoned.

[51] Int. Cl.$^6$ ............................. C09K 11/59; C09K 11/61
[52] U.S. Cl. ........................... 252/301.4 F; 252/301.4 H; 252/301.4 R
[58] Field of Search ............... 252/301.4 H, 301.4 R, 252/301.4 F; 501/12; 106/417, 415; 502/84; 423/332, 333, 331

[56] References Cited

U.S. PATENT DOCUMENTS

| | | | |
|---|---|---|---|
| 3,149,947 | 9/1964 | Eppler et al. | 65/33 |
| 3,149,982 | 9/1964 | Eppler | 106/39 |
| 5,032,547 | 7/1991 | Giannelis et al. | 252/512 |
| 5,185,180 | 2/1993 | Kasenga et al. | 427/67 |
| 5,306,441 | 4/1994 | Reddy et al. | 252/301.4 F |

FOREIGN PATENT DOCUMENTS 2307863  12/1976  France.

OTHER PUBLICATIONS

Luca et al, "Characterization of Copper(II)–Substituted Synthetic Fluorohectorite Clay and Interaction with Adsorbates by Electron Spin Resonance, Electron Spin Echo Modulation, and Infrared Spectroscopies". Chem. Mater. vol. 3, No. 6, 1991, 1073–81. no month.

Bergaya et al, "Luminescence of $Eu^{3+}$ and $Tb^{3+}$ Ions adsorbed on Hydrated Layer–lattice Silicate Surfaces.", J. Chem. Soc., Faraday Trans. II, 79, Part 4, Apr. 1983, 505–518.

W. Eitel, R. Hatch, M. Denny, J. Amer. Cer. Soc., 36, 341–348 (1953) Oct.

K. Kuroda, M. Ogawa, T. Yanagisawa, & C. Kato, Layered Inorganic–Organic Nanocomposites: Application to Photofunctional Materials and Conversion to Inorganic Micropourous Materials, Nanophase and Nanocomposite Materials Symposium, Dec. 1–3 1992, Boston, MA, pp. 335–347.

K. Kitajima, K. Miyaka, & N. Takusagawa, Changes in Swelling Characteristics and Structure of Na–Fluorine Micas with GA– and Al–Substitutions, J. Ceramic. Soc. Jpn. Int. Ed., 1991, 99(12), pp. 1174–1182. no month.

K. Kitajima and N. Daimon, Synthesis of Na–Fluor–Tetrasilicic Mica $[NaMg_{2.5}(Si_4O_{10})F_2]$ and its Swelling Characteristics, Nippon Kagaku Kaishi, (6), pp. 991–995 (1975) no month.

V. Luca, X. Chen, & L. Kevan, Chem. Mater. 3, pp. 1073–1081 (1991) no month.

H. Shell and K. Ivey, Fluoromicas, Bureau of Mines, U.S. Dept. of Interior Bulletin 647, pp. 123–144 (1969). no month.

Primary Examiner—Melissa Bonner
Attorney, Agent, or Firm—Robert F. Clark

[57] ABSTRACT

Inorganic intercalation phosphors were made by doping an inorganic intercalation compound having an atomic structure interspersed with vacant spaces with selected activator ions capable of luminescent emission when excited by ultraviolet light and/or cathode rays.

12 Claims, 1 Drawing Sheet

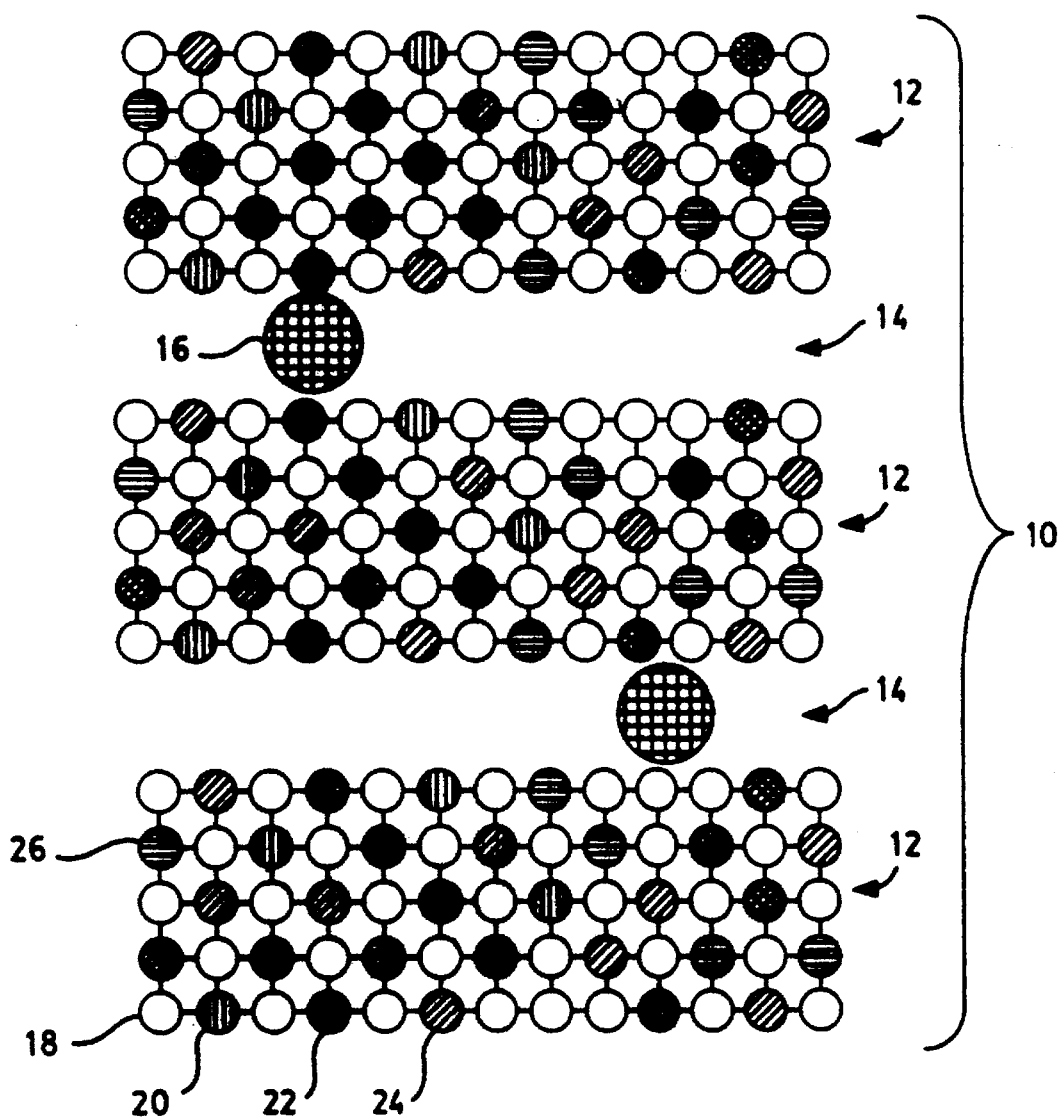

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a continuation-in-part of application Ser. No. 08/189,012, filed Jan. 28, 1994, now abandoned which is a continuation-in-part of application Ser. No. 07/999,637, filed Dec. 31, 1992, now abandoned, the disclosures of which are hereby incorporated by reference. This application is related to copending applications Ser. Nos. 08/425,849, 08/425,848, and 08/425,535, all filed Apr. 20, 1995.

TECHNICAL FIELD

This invention relates to phosphors and methods of making them. In particular, it relates to inorganic intercalation phosphors made by doping inorganic intercalation compounds with selected activator ions which, when excited by ultraviolet light, cathode rays or other exciting radiation, are capable of luminescent emission.

BACKGROUND ART

In present day society, there exist numerous applications for phosphors. For example, phosphors are critical components in a number of lamp types, electroluminescent devices, and cathode ray tubes for televisions and computer monitors. Generally, the perfomance of these devices can be directly linked to the performance of the phosphors which they incorporate. Thus, in order to promote the evolution of these technologies, it is essential that new phosphors routinely be developed which could be used in those applications.

For lighting applications, it is desirable that phosphors luminesce when stimulated by ultraviolet radiation (UV), which is generally defined as the portion of the electromagnetic spectrum between about 4–400 nm. Such UV excitable phosphors are defined as being photoluminescent. Photoluminescent phosphors find use in a number of different lamp types including fluorescent, high pressure mercury and neon sign lamps. For fluorescent lighting applications, it is particularly important that phosphors be stimulable by the primary ultraviolet emissions from low pressure mercury discharges which occur at 185 and 254 nm.

For cathode ray tube applications, it is necessary that phosphors luminesce when excited by cathode ray radiation (CR), which consists of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors.

Finally, most phosphors which are cathodoluminescent and/or photoluminescent are also electroluminescent and would likely be useable in electroluminescent devices. Thus, it would be an advantage in the art to provide novel phosphors which are capable of luminescent emission when excited by either ultraviolet radiation or cathode rays or both.

SUMMARY OF THE INVENTION

It is an object of this invention to provide inorganic intercalation phosphors capable of luminescent emission when excited by ultraviolet and/or cathode rays.

It is a further object of this invention to provide methods for producing inorganic intercalation phosphors.

In accordance with one object of the invention, inorganic intercalation phosphors having the general formulas $Na_a(Mg_{2.5}Li_b)(Si_4O_{10})(X)_2:A_y$ and $(NaF)(NaMg_{2.5}Si_4O_{10}F_2):A_y$, where X is $OH^-$ or $F^-$, A is an activator selected from Eu, Mn, and Tb, y ranges from about 0.02 to about 0.12, and a+b=1, are provided.

In accordance with a further object of the invention, an inorganic intercalation phosphor having the general formula $Na_{0.5}(Mg_{2.5}Li_{0.5})(Si_4O_{10})(OH)_2:A_y$, where A is an activator selected from Eu, Mn, and Tb, and y ranges from about 0.02 to about 0.12, is made by the steps of:

(a) forming a first solution of ethanol and an amount of tetraethoxysilane, the amount of tetraethoxysilane being at least 10% in excess of a stoichiomteric amount of tetraethoxysilane;

(b) stirring the first solution at about 60° C. for at least 3 hours;

(c) mixing the first solution with an aqueous solution containing stoichiometric amounts of a soluble magnesium salt and a soluble salt of the activator to form a third solution;

(d) adding NaOH dropwise to the third solution to achieve a pH of about 9.5 and form a gel-like precipitate;

(e) separating the precipitate from the third solution;

(f) washing the precipitate;

(g) resuspending the precipitate in an aqueous solution containing a stoichiometric amount of LiF and an excess of NaF; and (h) refluxing the precipitate for a time sufficient to form the phosphor.

In an alternative embodiment, inorganic intercalation compounds having the general formula $NaMg_{2.5}Si_4O_{10}F_2:A_y$ or $(NaF)(NaMg_{2.5}Si_4O_{10}F_2):A_y$ where A is an activator selected from Eu, Mn, Tb, and y ranges from about 0.02 to about 0.12, are made by the steps of:

(a) forming a mixture of stoichiometric amounts of MgO, $SiO_2$, $Na_2CO_3$, $Na_2SiF_6$ and an oxide or carbonate of an activator; and (b) firing the mixture at between about 570° C. to about 1300° C. for a time sufficient to form the phosphor.

BRIEF DESCRIPTION OF THE DRAWINGS

The figure is a schematic diagram representing the approximate atomic structure of fluorophlogopite, an inorganic intercalation compound.

BEST MODE FOR CARRYING OUT THE INVENTION

For a better understanding of the present invention, together with other and further objects, advantages and capabilities thereof, reference is made to the following specification and appended claims.

Numerous inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

The figure is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosilicate intercalation compounds having an atomic structure which is interspersed with networks of channels and/or cages filled with exchangeable cations and water. Zeolites have the general formula $M_xD_y(Al_{x+2y}Si_{n-(x+2y)}O_{2n}) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

ACTIVATOR ION DOPANTS AND THEIR EMISSION COLORS

| RED | GREEN | BLUE |
| --- | --- | --- |
| $Mn^{+2}$ | $Mn^{+2}$ | $Sb^{+3}$ |
| $Mn^{+4}$ | $Eu^{+2}$ | $Ti^{+4}$ |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites within the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation, to determine its luminescence intensity and its emission color. Luminescence intensity of the doped inorganic intercalation compound may be optimized by varying the amounts of the desired dopant ions.

Another lamellar intercalation compound is the clay mineral hectorite. In particular, two forms of the mineral, hectorite and sodium fluorohectorite, have been rendered luminescent by doping the compounds with activator ions. The general formula for these phosphors is $Na_a(Mg_{2.5}Li_b)(Si_4O_{10})(X)_2:A_y$, where X is $OH^-$ or $F^-$; A is an activator selected from Eu, Mn, and Tb; y ranges from about 0.02 to about 0.12; and a+b=1. Activated hectorites, $Na_{0.5}(Mg_{2.5}Li_{0.5})(Si_4O_{10})(OH)_2:A_y$, sodium fluorohectorites, $NaMg_{2.5}Si_4O_{10}F_2:A_y$, and modified sodium fluorohectorites, $(NaF)(NaMg_{2.5}Si_4O_{10}F_2):A_y$, have all been synthesized. All of the activated compounds exhibited the water-swellable behavior typical of these materials. In some cases, significant amounts of an undesireable non-water swellable amphibole were produced at the higher activator concentrations. However, the non-water swellable amphibole was easily separated from the water swellable phase in water.

The following non-limiting examples are presented.

Two different methods were used to make the hectorite and Na-fluorohectorite phosphors. The method used to make the hectorite phosphors involved combining an alcoholic solution containing an excess of tetraethoxysilane with an aqueous solution containing soluble salts of magnesium and the activator, adding NaOH to adjust the pH to about 9.5 to form a gel-like precipitate, and refluxing the precipitate in a solution of LiF and an excess of NaF for several days until the phosphor formed. The method used to make the Na-fluorohectorites was a solid state method which involved firing stoichiomteric amounts of MgO, $SiO_2$, $Na_2CO_3$, $Na_2SiF_6$, and an oxide or carbonate of the activator at between about 570° C. to about 1300° C. for a time sufficient to form the phosphor, from about 2 hours to about 22 hours. In some cases, the reactant mixture was fired with charcoal in order to produce a reducing atmosphere in the furnace to prevent oxidation of the activator.

The luminescence of the phosphor samples was evaluated by exciting them with ultraviolet (UV) and cathode ray (CR) radiation. Unless otherwise indicated, the unactivated forms of hectorite and Na-fluorohectorite exhibited no significant luminescence under either ultraviolet or cathode ray excitation. All brightness measurements given in the following examples are in foot-Lamberts (fL). Typical UV excitation was performed with the 254 nm line from a mercury discharge. Cathode ray excitation was typically performed using a focused high energy electron beam at 10 kV, 10 uA or 15 kV, 8 uA.

Hectorite phosphors

EXAMPLES 1–5

Eu-activated hectorite phosphors were prepared according to the general formula, $Na_{0.5}(Mg_{2.5}Li_{0.5})(Si_4O_{10})(OH)_2{:}Eu_y$. Except where indicated, stoichiometric amounts of the reactants were used. Several activator levels were selected from about 0.024 to about 0.072 moles Eu/mole phosphor.

Tetraethoxysilane (TEOS), $(C_2H_5O)_4Si$, in an amount at least 10% in excess of the stoichiometric amount was mixed with 100 ml of ethanol. The mixture was stirred at about 60° C. for at least three hours before combining with an aqueous solution of $MgCl_2$ and $EuCl_3$ in 200 ml of water. The resulting solution was agitated for at least 4 hours and then NaOH was added dropwise until the pH of the solution reached about 9.5 causing a gel-like precipitate to form. The solution was stirred for 12 hours, then the precipitate was separated from the solution by centrifugation and washed. The precipitate was resuspended in an aqueous solution of LiF and an excess amount of NaF and refluxed for about seven days.

EXAMPLES 6–8

Tb-activated hectorite, $Na_{0.5}(Mg_{2.5}Li_{0.5})(Si_4O_{10})(OH)_2{:}Tb_y$, samples having activator levels from about 0.024 to about 0.072 moles Tb/mole phosphor were prepared as in Examples 1–5 by substituting $TbCl_3$ for $EuCl_3$.

|  | Example 6 | Example 7 | Example 8 |
| --- | --- | --- | --- |
| $(C_2H_5O)_4Si$ (g) | 41.66 | 41.66 | 41.66 |
| $MgCl_2{.}6H_2O$ (g) | 21.31 | 21.31 | 21.31 |
| $TbCl_3{.}6H_2O$ (g) | 0.3733 | 0.7466 | 1.1198 |
| LiF (g) | 0.648 | 0.648 | 0.648 |
| NaF (g) | 3.0 | 3.0 | 3.0 |
| (moles Tb/mole phosphor) | (0.024) | (0.048) | (0.072) |
| CR Brightness (fL) | 1.45 | 1.48 | 1.45 |

The Tb-activated hectorite phosphors exhibited a bright green emission under UV and cathode ray excitation. The major emission peak was centered at about 542 nm. As with the Eu-activated hectorite, the CR brightness of these phosphors remained relatively constant over the range of Tb activator concentrations.

Sodium fluorohectorite phosphors

EXAMPLES 9–13

Mn-activated Na-fluorohectorite phosphors, $NaMg_{2.5}Si_4O_{10}F_2{:}Mn_y$, were prepared by mixing stiochiometric amounts of MgO, $SiO_2$, $Na_2CO_3$, $Na_2SiF_6$, and $MnCO_3$ on a paint-shaker for 40 minutes. The starting materials thus mixed were charged into 100 ml alumina crucibles and fired with charcoal in order to generate a reducing atmosphere in the furnace to prevent the oxidation of $Mn^{2+}$. The firing temperature program used involved increasing the temperature from 700° C. to 1300° C. over a period of 4 hours, holding at 1300° C. for 2 hours, decreasing the temperature to 925° C. over 3 hours, holding at 925° C. for 8 hours and then decreasing to 700° C. over 2 hours. Several activator levels from about 0.02 to about 0.10 moles Mn/mole phosphor were used. The fired samples had a maximum CR brightness of about 0.71 fL and a purple body color which indicated the presence of $Mn^{4+}$ in the phosphor. The phosphor samples were refired in 4% $H_2/N_2$ at 850° C. for 2 hours in order to reduce the $Mn^{4+}$ to $Mn^{2+}$. The body color of the refired samples was nearly white and the maximum CR brightness increased by 38% to 0.98 fL.

The Mn activator tended to promote the formation of non-water swellable amphibole more than rare earth activators did. The higher the Mn activator level, the more

|  | Example 1 | Example 2 | Example 3 | Example 4 | Example 5 |
| --- | --- | --- | --- | --- | --- |
| $(C_2H_5O)_4Si$ (g) | 41.66 | 41.66 | 41.66 | 41.66 | 41.66 |
| $MgCl_2{.}6H_2O$ (g) | 21.31 | 21.31 | 21.31 | 21.31 | 21.31 |
| $EuCl_3{.}6H_2O$ (g) | 0.3664 | 0.5495 | 0.7328 | 0.9158 | 1.0922 |
| LiF (g) | 0.648 | 0.648 | 0.648 | 0.648 | 0.648 |
| NaF (g) | 3.0 | 3.0 | 3.0 | 3.0 | 3.0 |
| (moles Eu/mole phosphor) | (0.024) | (0.036) | (0.048) | (0.060) | (0.072) |
| CR Brightness (fL) | 0.80 | 0.80 | 0.80 | 0.81 | 0.81 |

The Eu-activated hectorite phosphors exhibited a red emission under UV and cathode ray excitation. The major emission peak was centered at about 612 nm. Each of the activator levels yielded a CR brightness of about 0.80 fL.

amphibole formed. About 50% amphibole was found in the sample with the highest Mn doping level. Since Na-fluorohectorite swells in water and the amphibole does not, it was easy to separate the two phases in water.

|  | Example 9 | Example 10 | Example 11 | Example 12 | Example 13 |
|---|---|---|---|---|---|
| $SiO_2$ (g) | 11.18 | 11.18 | 11.18 | 11.18 | 11.18 |
| MgO (g) | 5.11 | 5.11 | 5.11 | 5.11 | 5.11 |
| $Na_2CO_3$ (g) | 0.8965 | 0.8965 | 0.8965 | 0.8965 | 0.8965 |
| $Na_2SiF_6$ (g) | 3.18 | 3.18 | 3.18 | 3.18 | 3.18 |
| $MnCO_3$ (g) | 0.1167 | 0.2333 | 0.3500 | 0.4667 | 0.5834 |
| (moles Mn/mole phosphor) | (0.02) | (0.04) | (0.06) | (0.08) | (0.10) |
| Brightness (fL) before firing in $H_2$ | 0.65 | 0.68 | 0.68 | 0.68 | 0.71 |
| Brightness (fL) after firing in $H_2$ | 0.90 | 0.90 | 0.96 | 0.92 | 0.98 |

The Mn-activated Na-fluorohectorite phosphors exhibited a pink emission under UV excitation, and a deep red emission, typical of $Mn^{2+}$, under cathode ray excitation. The CR excited emission peak was centered at about 682 nm. The CR brightness was relatively constant over Mn activator concentration range.

EXAMPLES 14–18

Tb-activated fluorohectorite phosphors, $NaMg_{2.5}Si_4O_{10}F_2$:$Tb_y$, were prepared by mixing stoichiometric amounts of MgO, $SiO_2$, $Na_2CO_3$, $Na_2SiF_6$, and $Tb_4O_7$ on a paint-shaker for 40 minutes. The starting materials thus mixed were charged into 100 ml alumina crucibles and fired using the following firing temperature program: increasing the temperature from 700° C. to 1300° C. over 4 hours, holding at 1300° C. for 2 hours, decreasing the temperature to 925° C. over 4 hours, holding at 925° C. for 10 hours and decreasing to 570° C. over 2 hours. Phosphors having activator levels from about 0.02 to about 0.12 moles Tb/mole phosphor were made.

|  | Example 14 | Example 15 | Example 16 | Example 17 | Example 18 |
|---|---|---|---|---|---|
| $SiO_2$ (g) | 11.18 | 11.18 | 11.18 | 11.18 | 11.18 |
| MgO (g) | 5.11 | 5.11 | 5.11 | 5.11 | 5.11 |
| $Na_2CO_3$ (g) | 0.8965 | 0.8965 | 0.8965 | 0.8965 | 0.8965 |
| $Na_2SiF_6$ (g) | 3.18 | 3.18 | 3.18 | 3.18 | 3.18 |
| $Tb_4O_7$ (g) | 0.1897 | 0.5692 | 0.7589 | 0.9486 | 1.1384 |
| (moles Tb/mole phosphor) | (0.02) | (0.06) | (0.08) | (0.10) | (0.12) |
| Brightness (fL) | 0.65 | 0.98 | 1.40 | 0.49 | 0.56 |

The Tb-activated Na-fluorohectorite phosphors exhibited a green emission, typical for $Tb^{3+}$, under UV and cathode ray excitation. The major emission peak was centered at about 540 nm. The optimum CR brightness, 1.40 fL, was acheived at an activator level of 0.08 moles Tb/mole phosphor.

Modified sodium fluorohectorite phosphors

EXAMPLES 19–23

Modified Tb-activated Na-fluorohectorite phosphors, $(NaF)(NaMg_{2.5}Si_4O_{10}F_2)$:$Tb_y$, were prepared by mixing stoichiometric amounts of MgO, $SiO_2$, $Na_2CO_3$, $Na_2SiF_6$, and $Tb_4O_7$ on a paint-shaker for 40 minutes. The starting materials thus mixed were charged into 100 ml alumina crucibles and fired at 1100° C. for 2 hours. Rapid cooling was necessary in order to limit the amount of amphibole in the product. Non-water swellable amphibole was seen (5–7%) in the high activator level samples and was easily separated from the water swellable phase in water. Phosphors having activator levels from about 0.02 to about 0.10 moles Tb / mole phosphor were prepared.

|  | Example 19 | Example 20 | Example 21 | Example 22 | Example 23 |
|---|---|---|---|---|---|
| $SiO_2$ (g) | 9.64 | 9.64 | 9.64 | 9.64 | 9.64 |
| MgO (g) | 4.62 | 4.62 | 4.62 | 4.62 | 4.62 |
| $Na_2CO_3$ (g) | 2.43 | 2.43 | 2.43 | 2.43 | 2.43 |
| $Na_2SiF_6$ (g) | 4.31 | 4.31 | 4.31 | 4.31 | 4.31 |
| $Tb_4O_7$ (g) | 0 | 0.1715 | 0.5144 | 0.6858 | 0.8573 |
| (moles Tb/mole phosphor) | (0.00) | (0.02) | (0.06) | (0.08) | (0.10) |
| CR Brightness (fL) | 0.39 | 0.67 | 0.87 | 1.51 | 1.10 |

The modified Tb-activated Na-fluorohectorite phosphors exhibited a green emission, typical for $Tb^{3+}$, under UV and cathode ray excitation. The major emission peaks were centered at 540 and 550 nm. Optimum CR brightness was acheived at 0.08 moles Tb/mole phosphor.

EXAMPLES 24–28

Modified Mn-activated Na-fluorohectorite phosphors, $(NaF)(NaMg_{2.5}Si_4O_{10}F_2):Mn_y$, were prepared by mixing stoichiometric amounts of MgO, $SiO_2$, $Na_2CO_3$, $Na_2SiF_6$, and $MnCO_3$ on a paint-shaker for 40 minutes. The starting materials thus mixed were charged into 100 ml alumina crucibles and fired with charcoal at 1100° C. for 4 hours. The fired samples had a purple body color indicating the presence of $Mn^{4+}$. The samples were refired in 4% $H_2/N_2$ at 850° C. for 2 hours to reduce $Mn^{4+}$ to $Mn^{2+}$. The body color of the refired samples was nearly white indicating successful reduction of $Mn^{4+}$ to $Mn^{2+}$. Phosphors having activator levels between about 0.02 and about 0.10 moles Mn/mole phosphor were prepared.

As with the parent Na-fluorohectorite, the Mn activator tended to promote the formation of non-water swellable amphibole which was separated from the water swellable phase in water. About 50% amphibole was found in the sample with the greatest Mn activator level.

|  | Example 24 | Example 25 | Example 26 | Example 27 | Example 28 |
| --- | --- | --- | --- | --- | --- |
| $SiO_2$ (g) | 9.64 | 9.64 | 9.64 | 9.64 | 9.64 |
| MgO (g) | 4.62 | 4.62 | 4.62 | 4.62 | 4.62 |
| $Na_2CO_3$ (g) | 2.43 | 2.43 | 2.43 | 2.43 | 2.43 |
| $Na_2SiF_6$ (g) | 4.31 | 4.31 | 4.31 | 4.31 | 4.31 |
| $MnCO_3$ (g) | 0.1054 | 0.2109 | 0.3163 | 0.4218 | 0.5272 |
| (moles Mn/mole phosphor) | (0.02) | (0.04) | (0.06) | (0.08) | (0.10) |
| Brightness (fL) | 1.40 | 1.68 | 2.07 | 2.55 | 2.02 |

The modified Mn-activated Na-fluorohectorite phosphors exhibited a red emission under UV and cathode ray excitation. The major emission peak for $(NaF)(NaMg_{2.5}Si_4O_{10}F_2):Mn$ was centered at 654 nm which was 28 nm lower than the emission peak for $NaMg_{2.5}Si_4O_{10}F_2:Mn$ (682 nm). Consequently, the CR brightness of the modified Mn-activated Na-fluorohectorite, $(NaF)(NaMg_{2.5}Si_4O_{10}F_2):Mn$ was improved by 160% over the Mn activated Na-fluorohectorite.

While there have been shown what are at present considered to be the preferred embodiments of the invention, it will be apparent to those skilled in the art that various changes and modifications can be made herein without departing from the scope of the invention as defined by the appended claims.

We claim:

1. A phosphor having the general formula $NaMg_{2.5}Si_4O_{10}F_2:A_y$, where A is an activator selected from Eu, Mn, and Tb and y ranges from about 0.02 to about 0.12.

2. The phosphor of claim 1 wherein the activator is Mn and y is from about 0.02 to about 0.10.

3. The phosphor of claim 1 wherein the activator is Tb and y is from about 0.02 to about 0.12.

4. The phosphor of claim 3 where y is 0.08.

5. A phosphor having a general formula $(NaF)(NaMg_{2.5}Si_4O_{10}F_2):A_y$ where A is an activator selected from Eu, Mn, and Tb, and y ranges from about 0.02 to about 0.12.

6. The phosphor of claim 5 wherein the activator is Tb and y is from about 0.02 to about 0.10.

7. The phosphor of claim 6 wherein y is 0.08.

8. The phosphor of claim 5 wherein the activator is Mn and y is from about 0.02 to about 0.10.

9. The phosphor of claim 8 wherein y is 0.08.

10. A method of making a phosphor having a general formula $NaMg_{2.5}Si_4O_{10}F_2:A_y$ or $(NaF)(NaMg_{2.5}Si_4O_{10}F_2):A_y$ where A is an activator selected from Eu, Mn, Tb, and y ranges from about 0.02 to about 0.12, comprising the steps of:

(a) forming a mixture of stoichiometric amounts of MgO, $SiO_2$, $Na_2CO_3$, $Na_2SiF_6$ and an oxide or carbonate of an activator; and (b) firing the mixture at between about 570° C. to about 1300° C. for a time sufficient to form the phosphor.

11. The method of claim 10 wherein the mixture is fired with charcoal.

12. The method of claim 11 wherein the mixture is refired in a 4% $H_2/N_2$ atmosphere.

* * * * *